March 16, 1948.  C. LYNN  2,438,015
SHUNTED BRUSH
Filed Jan. 10, 1945
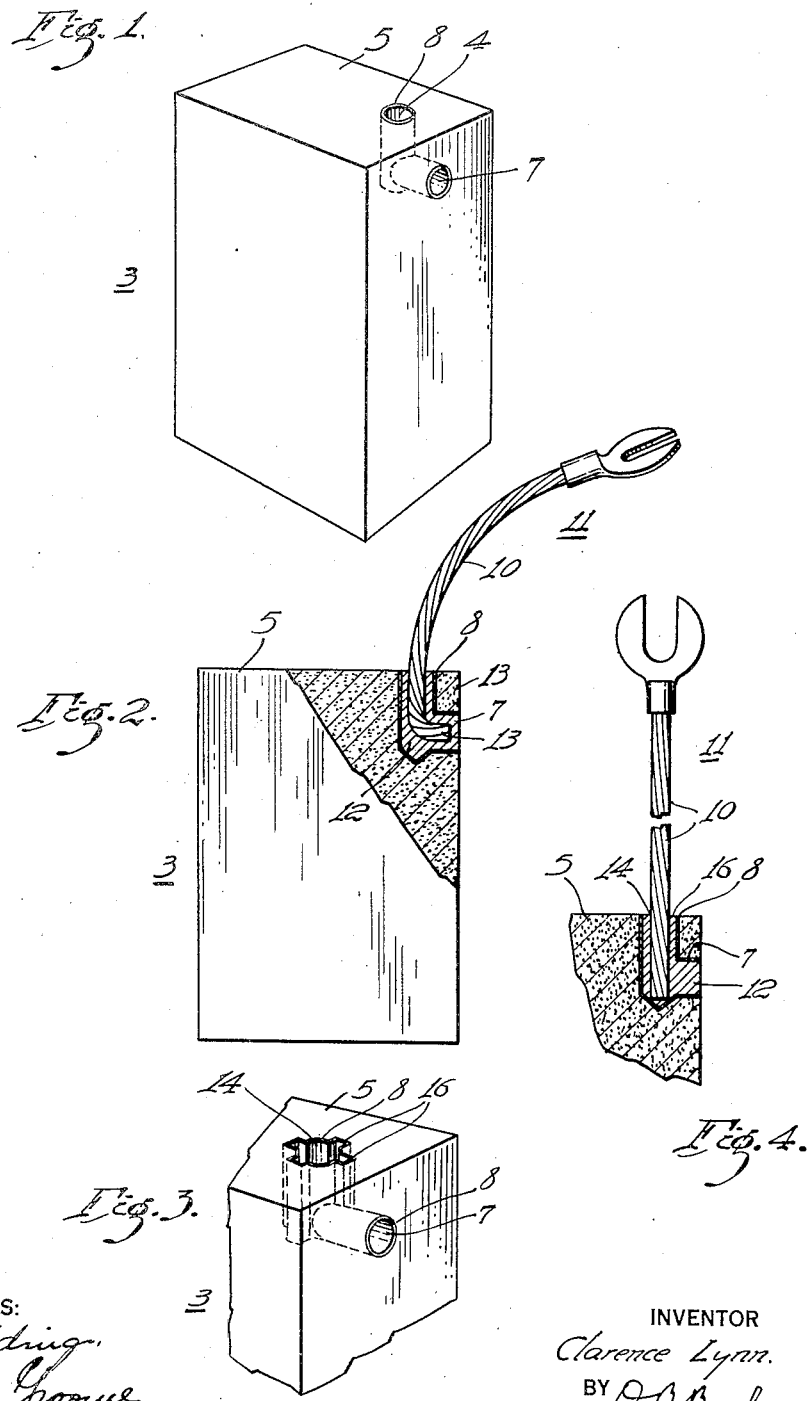
INVENTOR
Clarence Lynn.
BY O. B. Buchanan
ATTORNEY

UNITED STATES PATENT OFFICE 2,438,015

SHUNTED BRUSH

Clarence Lynn, Wilkinsburg, Pa., assignor to Westinghouse Electric Corporation, East Pittsburgh, Pa., a corporation of Pennsylvania Application January 10, 1945, Serial No. 572,125

1 Claim. (Cl. 171—325)

My invention relates to electrical brushes such as are used on electrical machines or apparatus, such brushes being commonly carbon brushes or metal graphite brushes or brushes of any other electrically conducting composition-material.

The principal object of my invention is to provide such a brush with a shunt-attachment which will have a low drop, which will be subject to minimum trouble, due either to vibration or to expansion and contraction, and which will be as stout as possible, mechanically.

A more specific object of my invention is to provide a brush having a soldered embedded shunt of improved construction.

Heretofore, the most successful embedded types of brush-shunts have been either of a type in which the shunt was pushed into a hole in the top of the brush, with an enlargement at the bottom of the hole, the enlargement being filled with a powdered copper mixture which is tamped around the hole to secure a good electrical connection, or a type in which the hole was threaded, and then sprayed with a metal coating, before the shunt was placed in the hole and surrounded with tamped-in copper. The sprayed-metal coating, however, did not get back into the grooves of the threads, because of the small diameter of the hole, which is usually between an eighth of an inch and a quarter of an inch in diameter.

A characteristic feature of my new shunt-attachment is the use of a straight hole, which may be splined or fluted, and which is preferably used in cooperation with an auxiliary lateral hole which is drilled into the brush from the side. The straight hole which is to receive the shunt can then be copper-sprayed or metal-coated, with the metal-coating well covering the entire surfaces of the hole, even if splined or fluted. The flexible copper cable of the shunt is then inserted in the hole, and is firmly soldered in place, providing a joint having an extremely low electrical resistance, and having a mechanical strength which is greater than the strength of the rest of the brush.

The preferred form of construction of my shunted brush is shown in the accompanying drawing, in which Figure 1 is a perspective view of the brush, with the holes prepared for the reception of the shunt, but before the shunt is in place, Fig. 2 is a cross sectional view of the completed brush, with the shunt in place, and Figs. 3 and 4 are views similar to Figs. 1 and 2, respectively, showing a modification.

In Figs. 1 and 2, I have shown a brush 3, which may be a "carbon" brush, or a "metal graphite" brush, or a brush of any other electrically conducting composition-material. A straight hole 4 is drilled into the top end 5 of the brush. An auxiliary side-hole 7 is also preferably drilled into the brush from the side, so as to communicate with the lower portion of the main hole 4.

The straight hole 4 is then copper-plated by spraying copper into it, or it is otherwise provided with a metallic coating 8 which well covers the walls of the hole 4, and preferably also the walls of the side-hole 7. The copper or other metallic plating 8 is then lightly covered with soldering flux. The brush is now ready to receive the end of the flexible copper or other metallic cable 10 which constitutes the bottom end of the shunt 11. Before inserting the bottom end of the cable 10 into the hole 4, this end of the cable is preferably also lightly covered with flux, for a suitable distance back from the end of the cable. While only one shunt is shown, it is understood that the brush may have two or more shunts.

The cable 10 of the shunt preferably makes a loose fit within the hole 4. After the cable-end has been inserted into the hole 4, it is soldered in place, as indicated at 12. A convenient method of soldering is to insert the brush, with its shunt in place, into a pot of molten solder (not shown), up to the top of the brush, where it is held long enough for the solder to enter the auxiliary lateral hole 7, and the space between the main hole 4 and the cable 10, and by capillary action make a good bond between the strands of the copper cable 10 and the copper-plate 8 which lines the walls of the hole 4. The side-hole 7 provides additional means for facilitating the entry or circulation of the molten solder. Said side-hole 7 also facilitates the metal-spraying operation by providing an outlet for the air or gaseous blast which accompanies the spray as it is directed into the splined hole 4. When the brush is lifted from the solder-pot, any excess solder will drain off, as it will not adhere to surfaces which are not metal-coated and flux-coated.

As shown in Fig. 2, the shunt-cable 10 may bend at the bottom, and may extend partway into the side-hole 7, as shown at 13, thus helping to lock the shunt into place.

As shown in Figs. 3 and 4, a somewhat smaller main hole 14 may be utilized, so that the cable 10 may make a snug fit therein. After the drilling of the straight main hole 14, and before the application of the metallic coating 8 therein, this main hole may be splined or fluted, by gouging one or more flutes or grooves 16 in the side of the hole, these grooves preferably extending straight down along the side of the hole. Then, when the metal coating 8 is sprayed on, it covers the walls of the flutes or grooves 16, as well as the walls of the main hole 14 and (when used) the walls of the side-hole 7. The splines or grooves 16 provide additional copper-plated areas for making a good electrical contact between the solder 12 and the brush-material 3, and said splines or grooves also provide a path for the molten solder to move up or down around the strands of the shunt-cable 10.

My improved brush is very economical to make. It has a phenomenally low electrical resistance, and a mechanical strength so great that the carbon itself will break before the shunt will pull off or break off.

It will be understood that other features, well known in brush-construction, may be utilized with my brush.

I claim as my invention:

A brush of an electrically conducting composition-material having a fluted hole extending into its top end, said hole having one or more flutes or grooves in its side, a side-hole communicating with a lower portion of said fluted hole, a metallic coating on the walls of said fluted hole, a shunt including a flexible metallic cable extending into said fluted hole, and a soldered connection between said cable and said metallic coating, said flutes or grooves extending approximately straight down along the side of the hole, and having solder therein.

CLARENCE LYNN.

REFERENCES CITED

The following references are of record in the file of this patent:

UNITED STATES PATENTS

| Number  | Name   | Date          |
|---------|--------|---------------|
| 847,303 | Platt  | Mar. 12, 1907 |
| 938,604 | Miller | Nov. 2, 1909  |

FOREIGN PATENTS

| Number  | Country       | Date          |
|---------|---------------|---------------|
| 392,067 | Great Britain | May 11, 1933  |
| 663,001 | France        | Mar. 29, 1929 |